US007930725B2

(12) United States Patent
Johnson et al.

(10) Patent No.: US 7,930,725 B2
(45) Date of Patent: *Apr. 19, 2011

(54) EARLY WARNING FAULT IDENTIFICATION AND ISOLATION SYSTEM FOR A TWO-WAY CABLE NETWORK

(75) Inventors: Keith Johnson, San Antonio, TX (US); Amol Mandelkar, Austin, TX (US)

(73) Assignee: Time Warner Cable, Inc., New York, NY (US)

( * ) Notice: Subject to any disclaimer, the term of this patent is extended or adjusted under 35 U.S.C. 154(b) by 72 days.

This patent is subject to a terminal disclaimer.

(21) Appl. No.: 12/534,915

(22) Filed: Aug. 4, 2009

(65) Prior Publication Data

US 2009/0300702 A1 Dec. 3, 2009

Related U.S. Application Data

(63) Continuation of application No. 11/069,155, filed on Mar. 1, 2005, now Pat. No. 7,594,252.

(51) Int. Cl.
*H04N 7/173* (2006.01)
*G01R 31/08* (2006.01)
*H04L 12/42* (2006.01)
*G06F 11/00* (2006.01)
*G06F 15/173* (2006.01)

(52) U.S. Cl. ........ 725/107; 725/124; 725/125; 370/216; 370/241; 370/242; 370/244; 370/449; 709/223; 709/224; 714/4

(58) Field of Classification Search .................. 725/107, 725/124–152; 709/223–224; 370/216–229, 370/241–242, 244, 351–430, 449–454; 714/1–57
See application file for complete search history.

(56) References Cited

U.S. PATENT DOCUMENTS

| 5,666,481 | A | 9/1997 | Lewis |
| 5,884,284 | A | 3/1999 | Peters et al. |
| 6,000,045 | A | 12/1999 | Lewis |
| 6,272,150 | B1 | 8/2001 | Hrastar et al. |
| 6,393,478 | B1 | 5/2002 | Bahlmann |
| 6,526,582 | B1 | 2/2003 | Brodigan et al. |
| 6,598,057 | B1 | 7/2003 | Synnestvedt et al. |
| 6,687,907 | B1 | 2/2004 | Bortolini |
| 6,704,288 | B1 | 3/2004 | Dziekan et al. |
| 6,898,800 | B2 | 5/2005 | Son et al. |
| 6,947,980 | B1 | 9/2005 | Knudsen et al. |
| 7,082,365 | B2 | 7/2006 | Sheha et al. |

(Continued)

*Primary Examiner* — Scott Beliveau
*Assistant Examiner* — Michael Telan
(74) *Attorney, Agent, or Firm* — The Marbury Law Group, PLLC (57) ABSTRACT

A system and method for determining an operational status of a segment of a hybrid fiber coax (HFC) cable network. Subscriber premises units (SPUs) connected to the HFC cable network are "pinged" and their responses recorded. The two most responsive SPUs in each node of the HFC cable network are identified. The most responsive SPU is added to a primary ping list and the next most responsive SPU is added to a secondary ping list. The SPUs on the primary list are "pinged" and their responses recorded. If an SPU on the primary list fails to respond, the secondary SPU associated with the node is pinged. If both the primary and secondary SPU associated with a node fail to respond to the "ping," the node is identified as non-responsive. If all of the nodes associated with a modulator (or a demodulator) are identified as non-responsive, the modulator (or demodulator) is identified as "non-responsive." Additionally, network devices are pinged and their responses noted. Using the responsiveness of nodes and network devices, faults in segments in an HFC cable network can be identified and located.

16 Claims, 5 Drawing Sheets

U.S. PATENT DOCUMENTS

| | | |
|---|---|---|
| 7,111,318 B2 | 9/2006 | Vitale et al. |
| 7,126,920 B2 | 10/2006 | Venkatesulu et al. |
| 7,227,889 B1 | 6/2007 | Roeck et al. |
| 7,233,649 B2 | 6/2007 | Kelliher et al. |
| 7,251,820 B1 | 7/2007 | Jost et al. |
| 7,301,909 B2 | 11/2007 | Langevin et al. |
| 7,451,098 B2 | 11/2008 | Ingman et al. |
| 7,493,378 B2 | 2/2009 | Kawashima |
| 7,584,425 B2 | 9/2009 | Nader et al. |
| 2002/0019983 A1 | 2/2002 | Emsley et al. |
| 2002/0061012 A1 | 5/2002 | Thi et al. |
| 2002/0109879 A1 | 8/2002 | Wing So |
| 2002/0136165 A1 | 9/2002 | Ady et al. |
| 2002/0143775 A1 | 10/2002 | Wilkinson et al. |
| 2003/0020765 A1 | 1/2003 | Kussmaul et al. |
| 2003/0145075 A1 | 7/2003 | Weaver et al. |
| 2004/0044554 A1 | 3/2004 | Bull et al. |
| 2004/0054771 A1 | 3/2004 | Roe et al. |
| 2005/0111063 A1 | 5/2005 | Shar et al. |
| 2005/0204290 A1 | 9/2005 | Eddy et al. |
| 2005/0286466 A1 | 12/2005 | Tagg et al. |

EARLY WARNING FAULT IDENTIFICATION AND ISOLATION SYSTEM FOR A TWO-WAY CABLE NETWORK

RELATIONSHIP TO OTHER APPLICATIONS

This application is a continuation of U.S. application Ser. No. 11/069,155 filed Mar. 1, 2005 now U.S. Pat. No. 7,594,252. The Ser. No. 11/069,155 application is incorporated herein by reference in their entireties for all purposes.

BACKGROUND

Embodiments of the present invention are directed generally to cable network fault identification and isolation and more specifically to the identification and isolation in components of a hybrid fiber coax (HFC) cable network that support two-way connectivity between subscribers and a headend.

Cable networks deliver voice, data, and video to subscribers over a complex network of headends, regional data centers, hubs, and nodes. At the upstream terminus of the network is the headend and regional data center. Typically, a head end comprises the analog and digital video signal processors, video on demand systems, and other video content management devices. A regional data center comprises digital service management devices (e-mail servers, DNS, and Internet connectivity) and routers that interconnect the regional data center with a headend. A hub receives the video and data signals from the headend and regional data center, processes these signals through appropriate modulators, and sends these signals downstream to a hub. The hub provides the signals to a node that is ultimately associated with individual subscribers. A node provides an interface between the fiber-based component of the HFC cable network and the RF/cable component of the network that is the transport media to the home.

In a commercial network, a headend may service multiple hubs and a hub may service multiple nodes. A regional data center may provide digital services to multiple headends. From a node to the home, the RF/cable component of the HFC cable network may branch numerous times. Amplifiers, line extenders, and passive devices are employed to maintain signal quality across all branches (or "cascades") serviced by the node.

Figure 1:
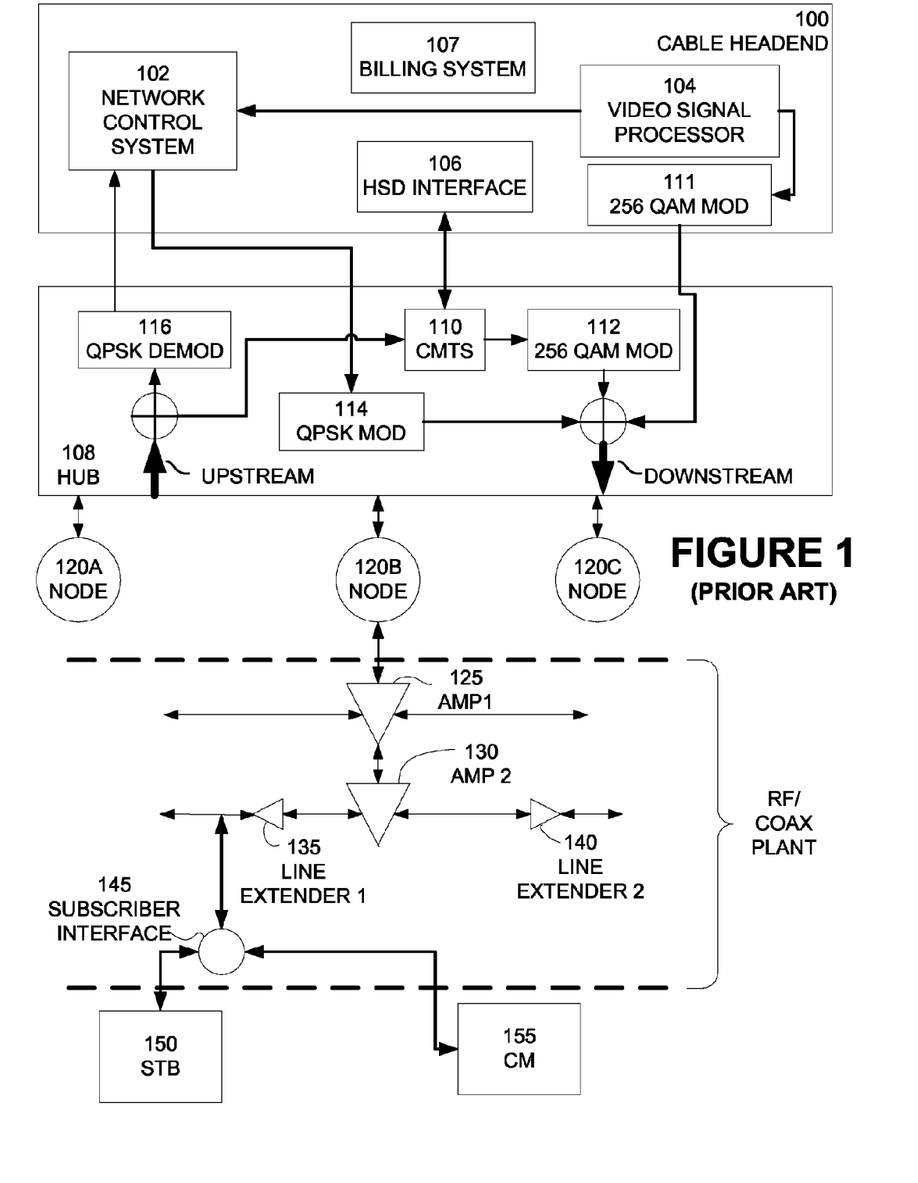
FIG. 1 illustrates typical cable system architecture.

FIG. 1 illustrates typical prior art cable system architecture. A headend 100 comprises a network control system 102 that handles set-top provisioning, system management and interactive session set-up, a video signal processor 104 that handles content acquisition and delivery, 256 QAM Modulators 111 that generate modulated RF streams of digital video signals, a high-speed data interface 106, and a billing system 107.

Headend 100 communicates with hub 108. Hub 108 comprises a cable modem termination system 110, a 256 QAM modulator 112 for downstream data traffic, a QPSK modulator for downstream Out-of-Band Data traffic 114, and a QPSK demodulator 116 for upstream Out-of-Band Data traffic. As will be appreciated by those skilled in the art, a hub may comprise multiple instances of each device illustrated in FIG. 1.

Hub 108 communicates with nodes 120A, 120B and 120C. Nodes 120 provide an interface between the fiber-based transport medium of the cable network (between the headend 100 and upstream side of nodes 110) and the coax-based medium (between the downstream side of nodes 110 and the subscriber interface 145). The downstream side of node 110B is further illustrated as connecting to bridger amplifier 1 125 which in turn is connected to bridger amplifier 2 130. The serial path from node 120B through bridger amplifier 1 125 to bridger amplifier 2 130 is referred to as a cascade relative to node 120B. Bridger amplifier 1 125 has three branches that are cascades relative to bridger amplifier 1 125 and sub-cascades relative to node 120B.

As will be appreciated by those skilled in the art, FIG. 1 is a greatly simplified schematic of cable network architecture. A hub typically serves 20,000 subscribers. A typical hub supports from 50 to 100 nodes with each node capable of serving 250 to 2000 subscribers. In order to maintain signal quality and quality of service commitments, trunk amplifiers maintain high signal quality. Internal bridger modules in the trunk amplifiers boost signals for delivery to subscribers' homes. Line Extender amplifiers maintain the high signal levels in cascade after the trunk amplifiers, through the neighborhoods. Taps divide out small amounts of signal for connection to the homes. Nominal cascade limits are up to 4 trunk amplifiers followed by up to 3 line extenders, with more in very rural areas. In suburban areas, cascades typically comprise 2 trunk and 2 line extenders. Because branching is unlimited, the total device count per node may be large despite short cascades.

At the downstream end of the network is the customer premises equipment (CPE). Referring again to FIG. 1, subscriber interface 145 connects a set top box (STB) 150 and a cable modem (CM) 155 to the HFC cable network. The CPE receives content from a headend or regional data center and provides access to it by a subscriber. For example, video programming is delivered to STB 150 and high-speed data services are delivered to CM 155.

The complexity of cable networks makes network fault isolation and maintenance a challenging task. The task can be partitioned into four stages:
  determining that a failure has occurred;
  determining what has failed;
  determining where in the network the failure is likely to be; and
  determining that a network is imminently approaching failure.

A failure in any of the system components that provide services will ultimately cause subscribers to complain. However, relying on subscriber complaints to identify network faults is not only bad for business but, in many situations, too imprecise to be helpful. Further, customer complaints represent the existence of a problem rather than forecast that a problem is developing. Reliance on such data alone for network fault isolation and maintenance precludes proactive responses by the cable operator. While network-wide fault identification systems may ultimately identify the existence of a fault and its location, such systems typically work with large volumes of data that is evaluated over time. Hence, they do not provide a real time measure of the health of the two-way components of an HFC cable network.

What would be useful is a system and method that alerts a cable operator of the occurrence of a fault within critical components of a HFC cable network in "real-time" and facilitates the isolation of the cause of the fault.

SUMMARY

Cable networks have evolved from downstream broadcast systems provided over coax cable to hybrid fiber cable (HFC) networks capable of both downstream and upstream communications using both analog and digital signals. With respect to video services, modern set top boxes send upstream signals to the headend to request video on demand (VOD) services, pay per view (PPV) services, and switched video broadcast (SVB) services and to issue control commands (play, stop, fast forward, rewind, and pause) that affect the video stream. Two-way STBs are addressable, can be associated with a subscriber, and can be associated with a physical location with an HFC cable network. As will be appreciated by those skilled in the art, an STB may be either a standalone device or incorporated into a cable-ready television. Additionally, a STB may be adapted such that the security and access functions are performed by an external PCMCIA-type card. See, OpenCable™ Multistream CableCARD Interface Specification OC-SP-MC-IF-I02-040831.

Because many STBs are addressable, it is possible to "ping" an STB to determine its presence on the HFC cable network and to draw conclusions about the path to and from the STB and devices that make up that path. As used herein, the verb "ping" means the act of using the ping utility or command. The ping utility sends a packet to a device with an IP address. As used herein, an IP address means a uniquely addressable identifier associated with network or home equipment capable of responding to a ping. The ping utility waits for a response. The response is indicative that the device received the ping-packet, that the device is present on the network, and that the path to the device is functional.

Embodiments of the present invention are directed to identifying and isolating faults in an HDC cable network using data obtained from pinging selected STBs connected to the HDC cable network. In an application entitled, "A Fault Detection And Isolation System For An HFC Cable Network And Method Therefor," the addressable STBs in an HFC cable network are pinged and the ping response data is stored. The application entitled, "A Fault Detection And Isolation System For An HFC Cable Network And Method Therefor," is incorporated by reference herein in its entirety for all purposes. A system and method for determining what has failed and where in the network the failure is likely to be found was described in U.S. patent application Ser. No. 11/040,391 filed on Jan. 21, 2005, entitled, "A Fault Isolation System And Method." The Ser. No. 11/040,391 Application is incorporated herein by reference in its entirety for all purposes.

An embodiment of the present invention provides a method for "pinging" particular STBs selected from ping response data gathered from all addressable STBs connected to an HFC cable network. In this embodiment, an STB "canary" tool (SCT) comprises software scripts and executables that permit very rapid "pinging" of a small group of highly responsive STBs in customer homes to determine two-way connectivity operational status for each fiber optic node of the HFC cable network. Knowing as quickly as possible whether the network is functioning properly permits rapid, informed escalation and dispatching of appropriate personnel to the source of a network problem.

In an exemplary embodiment of the present invention, ping data is acquired from addressable STBs in an HFC cable network. For each node of the HFC cable network, two STBs are selected. In an embodiment of the present invention, the selection criterion is the ratio of ping responses to ping queries (R/Q) and the STBs with the highest R/Q ratio are selected for pinging. In yet another embodiment, the selected STBs are chosen from a set of STBs having the highest R/Q ratio based on the distance the set members are from the node. In this embodiment, the set members that are furthest from the node are selected.

In an exemplary embodiment of the present invention, the SCT pings a primary and, if necessary a secondary, selected STB associated with a node once each minute to determine if the network downstream from that node is properly functioning as a two-way RF path. It also pings each addressable data communication device on the network paths that emanate from the hub to ascertain operational status of the device and the path connecting the device to the HFC cable network. With this information it is possible to quickly determine when elements of the HFC cable network stop providing two-way communications, the extent of the outage, and the likely source of the communications failure.

It is therefore an aspect of the present invention to determine whether a signal path in a two-way HFC cable network is operational.

It is another aspect of the present invention to facilitate the identification and isolation of faults in a signal path in a two-way HFC cable network in real time.

It is yet another aspect of the present invention to distinguish between faults in a hub and in a node of an HFC cable network.

These and other aspects of the present invention will become apparent from the general and detailed description that follows.

An embodiment of the present invention provides a method of determining an operational status of a segment of a hybrid fiber coax (HFC) cable network. A primary set top box (STB) and a secondary STB are selected. The primary STB and the secondary STB are connected to the HFC cable network and are associated with a node of the HFC cable network. The primary STB is associated with a primary STB IP address and the secondary STB is associated with a secondary STB IP address. The primary STB IP address is pinged. A determination is made whether a response is received from the primary STB. If a response is received from the primary STB, then a primary STB operational status of the primary STB is set to responsive. If a response is not received from the primary STB, the secondary STB IP address is pinged. A determination is made whether a response is received from the secondary STB. If a response is received from the secondary STB, then a secondary STB operational status of the secondary STB is set to responsive and the node operational status of the node is set to responsive. If a response is not received from the secondary STB, then the secondary STB operational status of the secondary STB is set to non-responsive and the node operational status of the node is set to non-responsive. An operational status of a network segment upstream from the node is determined based on the node operational status of all nodes serviced by the network segment upstream from the node.

In another embodiment of the present invention, the HFC cable network comprises a set of STBs. Selecting the primary STB and the secondary STB is accomplished by pinging IP addresses associated with the set of STBs periodically. For each pinged STB of the set of STBs, whether the pinged STB responded to the ping is recorded over a predetermined number of ping periods. For each pinged STB of the set of STBs, a ratio of ping attempts to responses over the predetermined number of ping periods is determined. The STB with the highest ratio of ping attempts to responses is selected as the primary STB. The STB with the next highest ratio of ping attempts to responses is selected as the secondary STB.

In yet another embodiment of the present invention, a node display string comprising data elements indicative of the node operational status is created. The node display string is sent to a display server and the data elements indicative of the node operational status are displayed.

In another embodiment of the present invention, the upstream component comprises a demodulator. In this embodiment, the node operational status of nodes associated with the demodulator is determined. If the node operational status of at least one node associated with the demodulator is responsive, then a demodulator operational status of the demodulator is set to responsive; and if the node operational status of the nodes associated with the demodulator is non-responsive, then the demodulator operational status of the demodulator is set to non-responsive. Remedial action to repair the demodulator is then taken. In an embodiment of the present invention, a demodulator display string comprising data elements indicative of the demodulator operational status is created. The demodulator display string is sent to a display server, and the data elements indicative of the demodulator operational status are displayed.

In another embodiment of the present invention, the upstream component comprises a modulator. In this embodiment, the node operational status of nodes associated with the modulator is determined. If the node operational status of at least one node associated with the modulator is responsive, then the modulator operational status of the modulator is set to responsive. If the node operational status of the nodes associated with the modulator is non-responsive, then the modulator operational status of the modulator to set to non-responsive. Remedial action to repair the modulator is taken. In an embodiment of the present invention, a modulator display string comprising data elements indicative of the modulator operational status is created. The modulator display string is sent to a display server, and the data elements indicative of the modulator operational status are displayed.

In another embodiment of the present invention, an IP address of a network component associated with the node is obtained. By way of illustration and not as a limitation, the network component may comprise an edge device, a router, and a switch. The network component IP address is pinged. A determination is made whether a response is received from the network component. If a response is received from the network component, then component operational status of the network component to set to responsive. If a response is not received from the network component, the component operational status of the network component to set to non-responsive. Remedial action to repair the network component is taken. In an embodiment of the present invention, a network component string comprising data elements indicative of the component operational status is created. The network component display string is sent to a display server, and the data elements indicative of the component operational status are displayed.

In yet another embodiment of the present invention, an operational status of a component downstream from the node is determined based on the component operational status of network components downstream from the node.

In an embodiment of the present invention, a system for determining an operational status of a segment of a hybrid fiber coax (HFC) cable network comprises a ping list generator, an STB pinger, a results processor, and a final results processor. The ping list generator selects a primary set top box (STB) and a secondary STB for pinging. In this embodiment, the primary STB and the secondary STB are connected to the HFC cable network and are associated with a node of the HFC cable network. The primary STB is associated with a primary STB IP address and the secondary STB is associated with a secondary STB IP address.

The STB pinger receives a ping list from the ping list generator comprising IP addresses associated with STB. The STB pinger pings the IP address of each STB on the ping list. If a response is received from an STB associated with a pinged IP address, the STB pinger sets an STB operational status of the STB as responsive. If a response is not received from the STB associated with the pinged IP address, the STB pinger sets the STB operational status of the STB as non-responsive.

The results processor determines an STB operational status of the primary STB. If the primary STB operational status is responsive, then the results processor sets a node operational status to responsive. If the primary STB operational status is non-responsive, the results processor sends the secondary IP address to the STB pinger. The results processor then determines an STB operational status of the secondary STB. If the secondary STB operational status is non-responsive, then results processor sets the node operational status to non-responsive.

The final results processor determines an operational status of a network segment upstream from the node based on the node operational status of all nodes serviced by the network segment upstream from the node.

In another embodiment of the present invention, the HFC cable network comprises a set of STBs and the ping list generator periodically pings the IP addresses associated with the set of STBs. For each pinged STB of the set of STBs, the ping list generator records whether the pinged STB responded to the ping over a fix number of ping periods and determines a ratio of ping attempts to responses. The ping list generator selects an STB with the highest ratio of ping attempts to responses as the primary STB and the STB with the next highest ratio of ping attempts to responses as the secondary STB.

In still another embodiment of the present invention, the final results processor creates a node display string comprising data elements indicative of the node operational status. The final results processor sends the node display string to a display server. The display server is displays the data elements indicative of the node operational status.

In an embodiment of the present invention, the upstream component comprises a demodulator. In this embodiment, the final results processor determines the node operational status of nodes associated with the demodulator. If the node operational status of at least one node associated with the demodulator is responsive, then the final results processor sets a demodulator operational status of the demodulator to responsive. If the node operational status of the nodes associated with the demodulator is non-responsive, the final results processor sets the demodulator operational status of the demodulator to non-responsive. The final results processor creates a demodulator display string comprising data elements indicative of the demodulator operational status. The final results processor sends the demodulator display string to a display server. The display server displays the data elements indicative of the demodulator operational status.

In an embodiment of the present invention, the upstream component comprises a modulator. In this embodiment, the final results processor determines the node operational status of nodes associated with the modulator. If the node operational status of at least one node associated with the modulator is responsive, then the final results processor sets a modulator operational status of the modulator to responsive. If the node operational status of the nodes associated with the modulator is non-responsive, the final results processor sets the modulator operational status of the modulator to non-responsive. The final results processor creates a modulator display string comprising data elements indicative of the modulator operational status. The final results processor sends the modulator display string to a display server. The display server displays the data elements indicative of the modulator operational status.

In an embodiment of the present invention, the system further comprises a network component pinger. The network component pinger obtains an IP address of a network component associated with the node and pings the network component IP address. By way of illustration and not as a limitation, the network component may comprise an edge device, a router, and a switch. The network component IP address is pinged. The network component pinger determines whether a response is received from the network component. If a response is received from the network component, network component pinger sets a component operational status of the network component to responsive. If a response is not received from the network component, network component pinger sets the component operational status of the network component to non-responsive.

The final results processor creates a network component display string comprising data elements indicative of the component operational status. The final results processor sends the network component display string to a display server. The display server displays the data elements indicative of the component operational status.

In yet another embodiment of the present invention, the final results processor is determines an operational status of a component downstream from the node based on the component operational status of network components downstream from the node.

DETAILED DESCRIPTION

The following terms are used in the description that follows. The definitions are provided for clarity of understanding:

| | |
|---|---|
| Bridger Amplifier - | Trunk/Bridger amplifiers amplify and reamplify cable signals for transmission through a cable television trunk system and out to the distribution system. They provide the interface between the trunk and distribution systems. Also called a bridger or a trunk/bridger amplifier. |
| Cascade - | A serial path extending from an active device. |
| CM - | Cable modem. |
| CPE - | Customer premises equipment. |
| Fork - | The verb "to fork" means the act of one or more instances of a segment of code within a script and executing each instance independent of the others. The original script is a "parent" and each instance is a "child." The parent continues to execute while each child is executing. |
| HFC - | Hybrid Fiber Coax. A network design that employs both fiber optic and coaxial cables to deliver cable video and data services. |
| Hub - | The local source of cable services. By way of illustration and not as a limitation, a hub may serve 20,000 subscribers. |
| IP Address - | A uniquely addressable identifier associated with network or home equipment capable of responding to a ping. |
| Line extender - | An amplifier that reamplifies the signal from the Trunk/Bridger amplifier. Taps that provide the cable connections to the homes are installed in the distribution cabling between the Trunk/Bridger amplifiers and the line extenders. |

-continued

| | |
|---|---|
| Node - | A device that provides an interface between the fiber optic and coaxial cable systems of an HFC cable system. Light from a fiber optic cable is converted into an electrical signal suitable for delivery in a coaxial cable system within this device. |
| Ping - | The verb "to ping" means the act of using the ping utility or command. The ping utility sends a packet to a device with an IP address and waits for a response. The response is indicative that the ping packet was received by the device and the device is present on the network. The noun "ping" means the request for a response from a network device. |
| Poll - | The verb "poll" means the act of using a utility or command by one network device to request data from another network device. |
| STB - | Set top box. |
| Tap - | A passive device that divides out small amounts of signal for connection to the homes. They typically have 2, 4 or 8 ports for connection of drop cables. |

Cable networks have evolved from downstream broadcast systems provided over coax cable to hybrid fiber cable (HFC) networks capable of both downstream and upstream communications using both analog and digital signals. With respect to video services, modern set top boxes send upstream signals to the headend to request video on demand (VOD) services pay per view (PPV) services, and switched video broadcast (SVB) services and to issue control commands (play, stop, fast forward, rewind, and pause) that affect the video stream. Two-way STBs are addressable, can be associated with a subscriber, and can be associated with a physical location with an HFC cable network.

Figure 2:
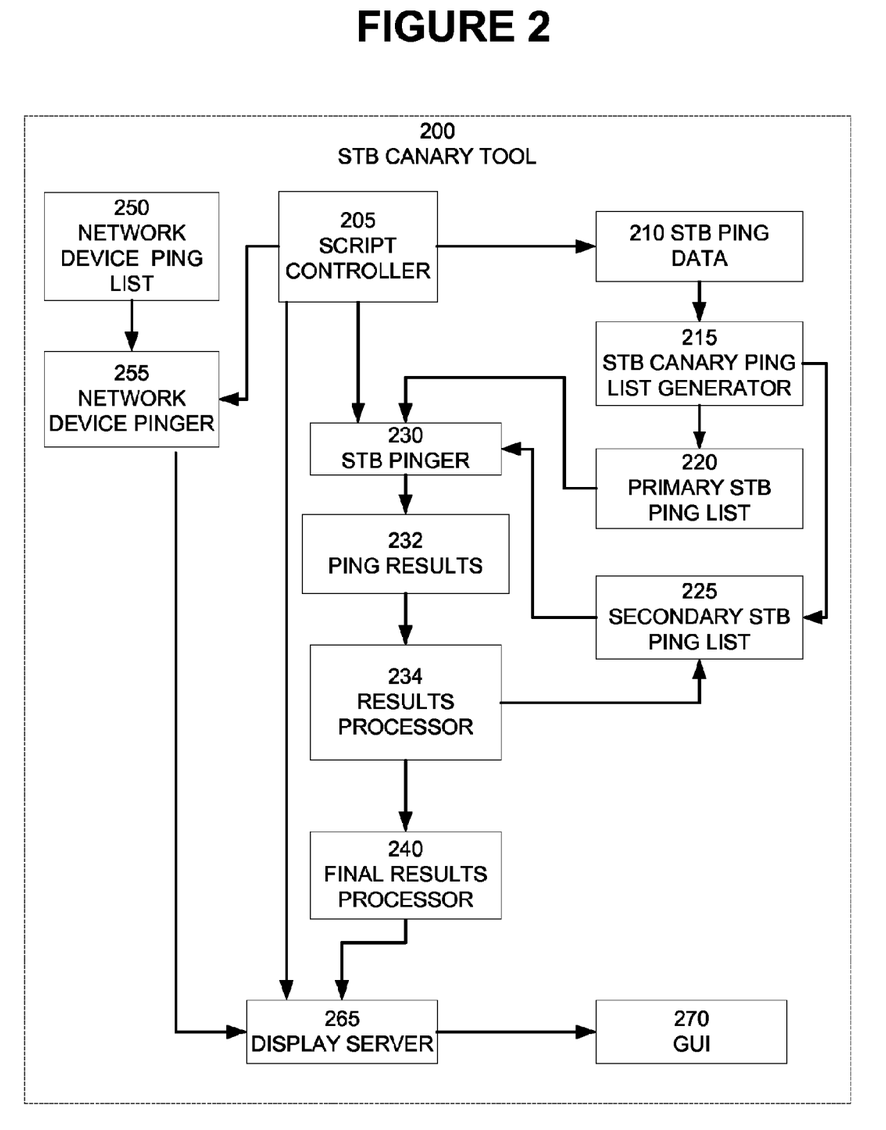
FIG. 2 illustrates a block diagram of high-level components of an STB "canary" tool (SCT) according to an embodiment of the present invention.

FIG. 2 illustrates a block diagram of high-level components of an STB "canary" tool (SCT) according to an embodiment of the present invention. SCT 200 comprises script controller 205, STB ping data 210, STB canary ping list generator 215, primary STB ping list 220, secondary STB ping list 225, STB pinger 230, ping results 232, results processor 234, final results processor 240, network device ping list 250, network device pinger 255, display server 265 and GUI 270.

In an exemplary embodiment of the present invention, script controller 205 makes "calls" to various scripts to control the processes of STB canary tool (SCT) 200. By way of illustration and not as a limitation, the script controller cycles each sixty seconds. During this cycle, script controller 205 acquires STB ping data 210 from a central ping data store (not illustrated), looks for updates to the previously acquired STB ping data, creates the primary and secondary ping lists, pings the primary and secondary STBs in each node, and pings the core network elements. In an embodiment of the present invention, script controller 205 determines if the STB ping data 210 has been updated since the last cycle. If the STB ping data 210 has been updated, script controller 205 copies the updated information to ping data 210 and creates primary STB ping list 220 and secondary STB ping list 225. If the STB ping data 210 has not been updated, the previous versions of these lists are reused for pinging.

In an exemplary embodiment of the present invention, ping data 210 comprises a record for each STB supported by a network control system (not illustrated). In this embodiment, the record for an STB comprises the STB serial number; STB MAC address; a hub, a demodulator, a node, a power supply, an amp, and a line extender associated with the STB; and the ping response and ping response history of the STB.

Canary ping list generator 215 receives the STB ping data 210 and generates primary STB ping list 220 and secondary STB ping list 225 for a node. Primary STB ping list 220 comprises a list of STB IP addresses selected using selection criteria determined by the HFC cable network operator. As used herein, an IP address means a uniquely addressable identifier associated with network or home equipment capable of responding to a ping. In an exemplary embodiment of the present invention, the STB having the highest ratio of ping responses to ping queries (R/Q) for a particular node is selected for pinging and added to STB ping list 220. In yet another embodiment, STB ping list is populated by selecting STBs having a high R/Q ratio that are furthest from the node.

Primary STB ping list 220 and secondary STB ping list 225 comprise the node, IP address, QPSK modulator ID and QPSK demodulator ID for each selected STB to be pinged.

STB pinger 230 comprises a pinging script that is called by script controller 205. In an embodiment of the present invention, STB pinger 230 uses a forking script to ping selected STBs simultaneously. The forking script comprises a "parent" and a predetermined number of copies of a code segment within the parent each referred to as a "child" and collectively referred to as "children." The parent creates sub-lists from primary ping list 220 and assigns a sub-list to each child. The children operate simultaneously to ping the STBs on their respective sub-lists. Each child executes its ping sub-list, captures the response data in a file, and then exits. The parent then creates another child to maintain the predetermined number of children and assigns another ping sub-list to the new child. The response data files created by each child are combined and stored in STB results 232.

Results processor 234 sets the operational status of all nodes to "responsive" and analyzes the results of the primary IP pinging to determine whether an STB associated with a node responded to the ping. If the primary STB failed to respond to the ping, the operational status of the node associated with that STB is changed to "Alert" and a list of secondary IP addresses is created for the non-responding nodes from secondary STB ping list 225. This secondary IP address list is passed to STB pinger 230. In an embodiment of the present invention, STB pinger 230 applies a forking script to ping the secondary IP addresses of the non-responding nodes. The ping response results of the STBs associated with the secondary IP address list are stored in ping results 232.

Results processor 234 analyzes the responses received from pinging of the STBs associated with the secondary IP addresses and the node operational status is again updated. If a node responded to a ping from either a primary IP address or a secondary IP address, it is tagged as "responsive." If an STB on the primary IP address failed to respond to the ping but there was no secondary IP address, as would be the case if the node were new and only a single STB were connected to it, the node operational status is set to "Alert." If no response is received from an STB associated with a primary or secondary IP address, the operational status of the node is set to "non-responsive."

The node operational status is passed from ping results 232 via results processor 234 to final processor 240. Final processor 240 evaluates nodes with the operational status "non-responsive" to determine if the failure can be related to a specific cause. In an embodiment of the present invention, final processor 240 checks the operational status of all nodes common to a QPSK modulator or demodulator. If the operational status of any nodes associated with a QPSK modulator is "responsive," the modulator has its operational status set to "responsive." If the operational status of all nodes associated with the QPSK modulator is "non-responsive," then the modulator operational status is set to "non-responsive." Likewise, if the operational status of any nodes associated with a QPSK demodulator is "responsive", then the demodulator operational status is set to "responsive." If the operational status of all nodes associated with the QPSK demodulator is "non-responsive," then the demodulator operational status is set to "non-responsive."

Display server 265 builds a string that may be used to display the results of the pinging process. In an embodiment of the present invention, the format of the string for the QPSK modulator is "YYYY.MM.DD-hhmm HRR, hhhh-On, . . . , EOM" where hhhh is the QPSK modulator name. The format of the string for the demodulator is "YYYY.MM.DD-hhmm DRR, hhhh.d-On, . . . , EOM" where hhhh.d is the hub name and QPSK demodulator ID number.

Script controller 205 directs network device pinger 255 to ping network devices (edge devices, switches, and routers) as identified on network device list 250 to determine the physical connection state of each device. After the operational status of each device is determined, it is forwarded to the display server 265. In an embodiment of the present invention, display server creates a string that comprises the operational state of each network device.

In an exemplary embodiment of the present invention, the operational state for all edge devices is conveyed by a text string in the format "YYYYMMDD-HHMM ERR, e ####>On, e ####>"non-responsive", . . . , e ####>On, EOM", the operational state for all switches is conveyed by a text string in the format "YYYYMMDD-HHMM ARR, a ####>On, a ####>"non-responsive", . . . , a ####>On, EOM", and the operational state for all routers is conveyed by a text string in the format "YYYYMMDD-HHMM PRR, p PowerHub>Alive, EOM."

Script controller 205 directs display server 265 to update the operational status of each node and to build a string to send to the GUI 270 for update of the node operational status display. It uses the header NRR.

GUI 270 parses the strings by the header notation NRR, HRR, DRR, ERR, ARR, and PRR to determine which graphical display to steer the data to.

Figure 3A:
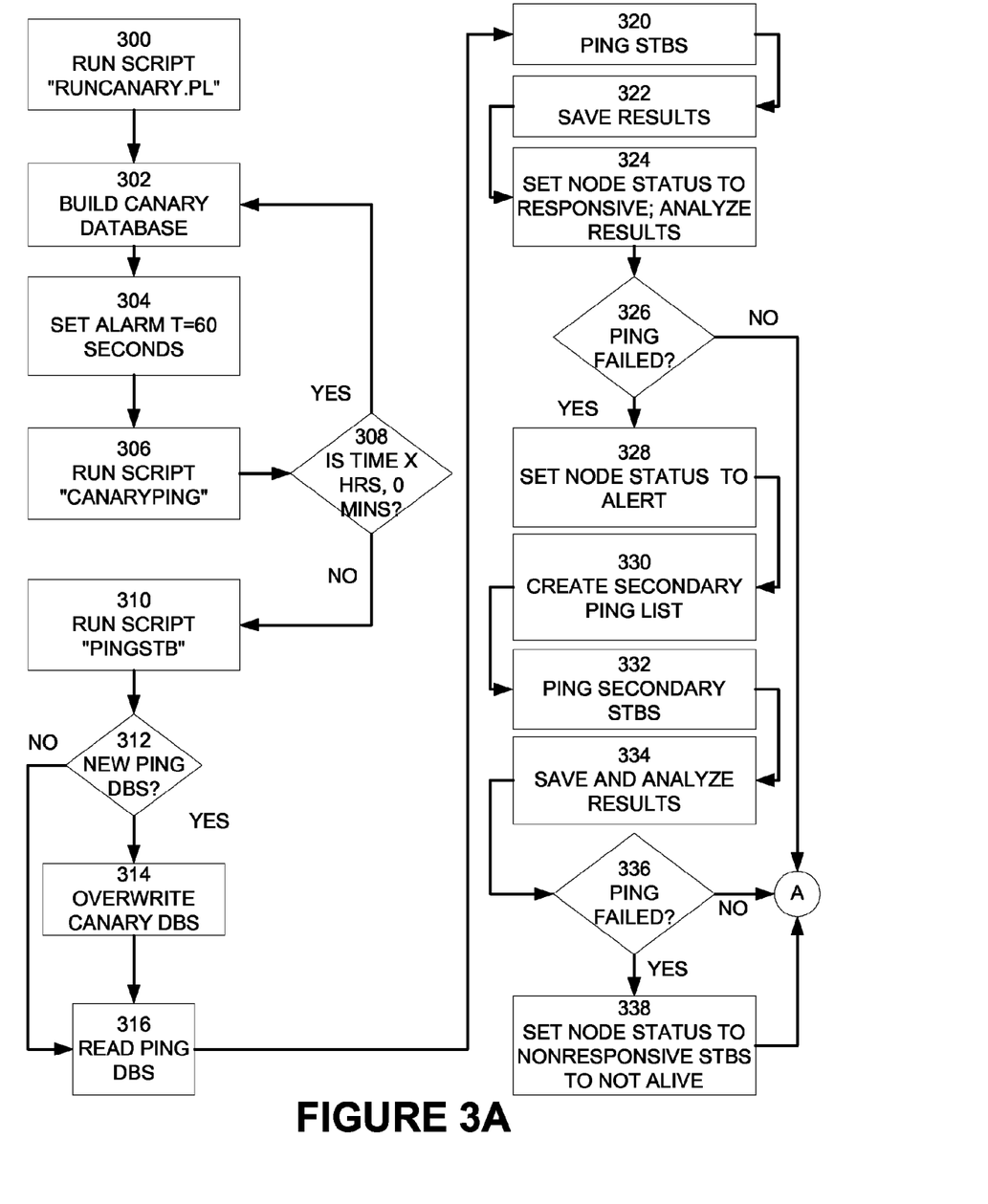
FIGS. 3A, 3B, and 3C illustrate a flow of a process by which the operational status of components of a HFC cable network is determined according to an embodiment of the present invention.
Figure 3B:
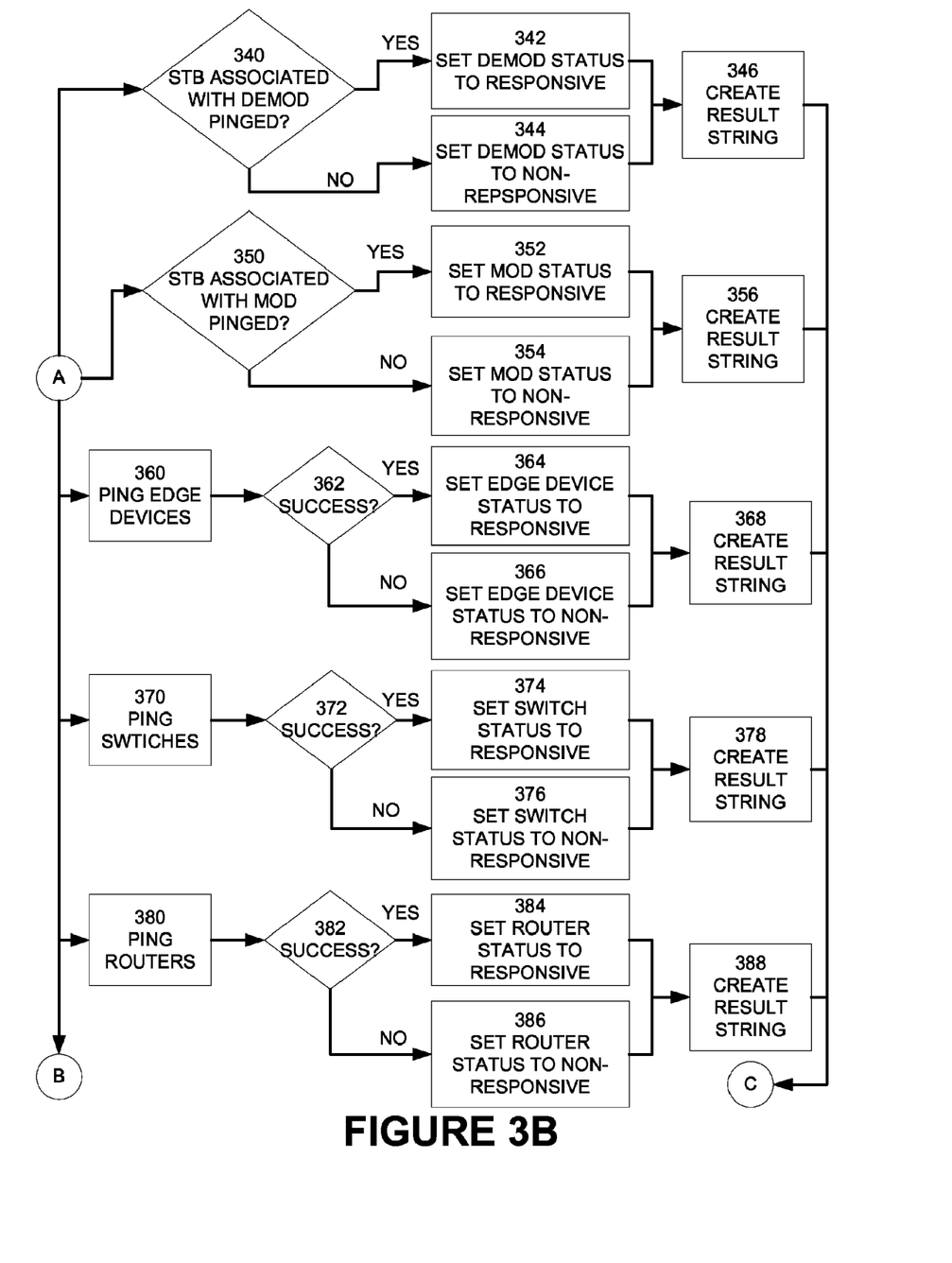
Figure 3C:
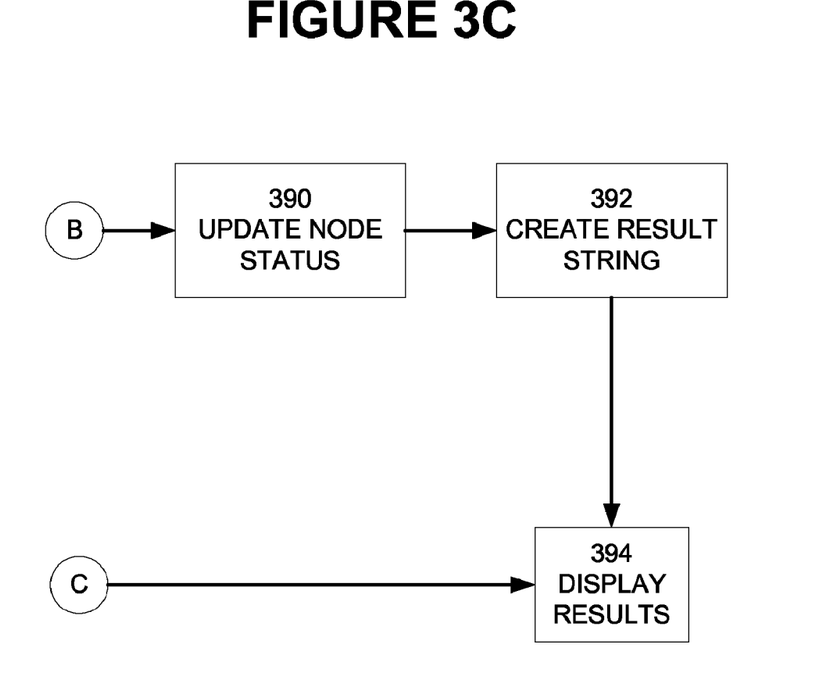

FIGS. 3A, 3B, and 3C illustrate a flow of a process by which the operational status of components of a HFC cable network is determined according to an exemplary embodiment of the present invention. Referring to FIG. 3A, a script "runCanary.pl" is executed 300. In this exemplary embodiment, "runCanary.pl" establishes a continuously running process that sets a 60-second alarm. Each 60 seconds, when the alarm triggers, it initiates a new cycle of the canary pinging process.

When the script is initially started, prior to setting the alarm, it first calls a script that builds a "canary" database 302. The build-canary-database-process is called prior to entering the alarm/sleep loop so that valid primary and secondary IP addresses exist for pinging before the trigger for pinging is enabled.

In this embodiment, the canary database comprises a list of primary highly-responding STB IP addresses and a list of secondary highly-responding STB IP addresses. The node, QPSK modulator ID and QPSK demodulator ID associated with the STB IP address are also incorporated into the list. In another embodiment of the present invention, an external script is called to obtain primary and secondary STB IP addresses that may not follow standardized rules. The canary database further comprises a "ping list" of the STB IP addresses from the primary list to be pinged. The contents of this file are all of the primary IP addresses to be pinged—from several hundred into the thousands depending on the size of the HFC cable network. Once the canary database is built, the alarm is set for 60 seconds 304. A script "canaryPing" is run. In this embodiment, the "canaryPing" script makes calls to other scripts within the process defined by "runCanary.pl." It begins by checking if the time is the top of the hour (xx:00 minutes) 308.

If the time is the top of the hour, "canaryPing" forks a child process that initiates the build-canary-database-process 302 to refresh the data that is used to create the STB IP address list. In this manner, canary database files are updated once an hour. By forking, this process (if called at the top of the hour) runs in parallel with the execution of the script "pingSTB" 310 described below.

The script "pingSTB" begins each 60 second cycle by checking whether new database files exist 312. If there are new databases, the canary database is overwritten 314. If the canary database has not been revised, the previous version is used. The ping list is then read 316, either as revised or as previously established.

The IP addresses on the ping list are then pinged 320 and the results saved 322. In an embodiment of the present invention, the ping script comprises a forking script to ping selected STBs simultaneously. The forking script comprises a "parent" and a predetermined number of copies of a code segment within the parent each referred to as a "child" and collectively referred to as "children." The parent creates sub-lists from a primary ping list and assigns a sub-list to each child. The children operate simultaneously to ping the STBs on their respective sub-lists. Each child executes its ping sub-list, captures the response data in a file, and then exits. The parent then creates another child to maintain the predetermined number of children and assigns another ping sub-list to the new child. The response data files created by each child are combined and stored as ping results 322.

The operational status of all nodes is set to "responsive" and the results of the pinging process analyzed 324. If an STB failed to respond to the ping 326, the operational status of the node associated with the STB is changed to "Alert" 328 and a list of secondary IP addresses is created for the non-responding nodes 330. This secondary list is pinged 332. The results are stored and analyzed 334.

If a node associated with an STB on the secondary IP address list failed to respond to a ping 336, its operational status is set to "non-responsive" 338.

In an embodiment of the present invention, if an STB on the primary IP address list did not respond to a ping but there was no secondary IP address associated with the node associated with the primary IP address, the operational status of the node is set to "alert." A node with a single box, that will not ping, may not be operating but a single box is not sufficient to declare it "non-responsive."

Referring now to FIG. 3B, the nodes with an operational status of "non-responsive" are analyzed. This process does not actually ping any additional devices, but rather looks at the results of pinging the STBs and checks the operational status of all nodes common to a QPSK demodulator (340) or modulator (350).

If the operational status of any nodes associated with a QPSK demodulator is "responsive," the demodulator has its operational status set to "responsive" 342. If the operational status of all nodes associated with the QPSK demodulator is "non-responsive," then the demodulator operational status is set to "non-responsive" 344. A result string is created that comprises the operational status of all demodulators associated with pinged STBs 346. In an embodiment of the present invention, the result string uses the format: "YYYY.MM.DD-hhmm DRR, hhhh.d-On, . . . , EOM," where hhhh.d is the hub name and QPSK demodulator ID number.

Likewise, if the operational status of any nodes associated with a QPSK modulator is "responsive", then the modulator operational status is set to "responsive" 352. If the operational status of all nodes associated with the QPSK modulator is "non-responsive," then the modulator operational status is set to "non-responsive" 354. A result string is created that comprises the operational status of all modulators associated with pinged STBs 356. In an embodiment of the present invention, the result string uses the format: "YYYY.MM.DD-hhmm HRR, hhhh-On, . . . , EOM," where hhhh is the QPSK modulator name.

Edge devices are pinged 360 and the response is evaluated 362. If a response is received, the edge device has its operational status set to "responsive" 364. If a response is not received, then its operational status is set to "non-responsive" 366. A result string is created that comprises the operational status of all pinged edge devices 368.

Switches are pinged 370 and the response is evaluated 372. If a response is received, the switch has its operational status set to "responsive" 374. If a response is not received, then its operational status is set to "non-responsive" 376. A result string is created that comprises the operational status of all pinged switches 378.

Routers are pinged 380 and the response is evaluated 382. If a response is received, the router has its operational status set to "responsive" 384. If a response is not received, then its operational status is set to "non-responsive" 386. A result string is created that comprises the operational status of all pinged routers 388.

The operational status of the nodes is updated 390 and a result string is created 392 that comprises the operational status of all hubs associated with pinged STBs.

The string results from the hubs, modulators, demodulators, edge devices, switches and routers are displayed 394.

In an embodiment of the present invention, the result strings are sent to a visual basic graphical user interface. Each result string comprises a header that identifies the content as relating to a particular network component.

As will be appreciated by those skilled in the art, the systems and methods described herein may also be applied to cable modems and media terminal adapters (eMTAs) to permit correlation of service failures to determine whether a complete node outage has occurred or only a partial services outage has occurred. Use of this data can also help determine whether the outage is one of operator equipment and systems or if it is potentially from a service utility provider (e.g. commercial power outage).

A fault detection and isolation system for an HFC cable network and method therefor have been described. It will be understood by those skilled in the art that the present invention may be embodied in other specific forms without departing from the scope of the invention disclosed and that the examples and embodiments described herein are in all respects illustrative and not restrictive. Those skilled in the art of the present invention will recognize that other embodiments using the concepts described herein are also possible. Further, any reference to claim elements in the singular, for example, using the articles "a," "an," or "the" is not to be construed as limiting the element to the singular. Moreover, a reference to a specific time, time interval, and instantiation of scripts or code segments is in all respects illustrative and not limiting.

What is claimed is:

1. A method of determining an operational status of a segment of a distribution network comprising:
  accessing a ping datastore to acquire ping data associated with a plurality of subscriber premises units (SPUs) connected to the distribution network through a common node, wherein the ping data comprise for each SPU of the plurality of SPUs a ratio of a number of ping responses to a number of ping queries;

selecting a primary SPU, wherein the primary SPU has the highest ratio of ping responses to ping queries and wherein the primary SPU is associated with a primary SPU IP address; and selecting a secondary SPU, wherein the secondary SPU has the second highest ratio of ping responses to ping queries and wherein the secondary SPU is associated with a secondary SPU IP address;

pinging the primary SPU IP address;

when a response from the ping is received from the primary SPU, then setting a primary SPU operational status of the primary SPU to responsive and setting a node operational status of the common node to responsive;

when a response from the ping is not received from the primary SPU, pinging the secondary SPU IP address;

when a response from the ping is received from the secondary SPU, then setting a secondary SPU operational status of the secondary SPU to responsive and setting a node operational status of the common node to responsive;

when a response from the ping is not received from the secondary SPU, then setting the secondary SPU operational status of the secondary SPU to non-responsive and setting the node operational status of the common node to non-responsive; and determining an operational status of a network component upstream from the common node based on the node operational status of all nodes serviced by the upstream network component.

2. The method of claim 1 further comprising:
creating a node display string comprising data elements indicative of the node operational status of the common node;
sending the node display string to a display server; and
displaying the data elements indicative of the node operational status of the common node.

3. The method of claim 1, wherein the plurality of SPUs are set top boxes (STBs) and wherein the STBs are addressable via an out-of-band channel (OOBC), wherein the upstream network component comprises an OOBC demodulator and wherein determining the operational status of a network component upstream from the common node based on the node operational status of all nodes serviced by the upstream network component comprises:
determining the node operational status of nodes associated with the OOBC demodulator;
when the node operational status of at least one node associated with the OOBC demodulator is responsive, then setting an OOBC demodulator operational status of the OOBC demodulator to responsive; and when the node operational status of the nodes associated with the OOBC demodulator is non-responsive, then setting the OOBC demodulator operational status of the OOBC demodulator to non-responsive; and
taking remedial action to repair the OOBC demodulator.

4. The method of claim 3 further comprising:
creating an OOBC demodulator display string comprising data elements indicative of the OOBC demodulator operational status;
sending the OOBC demodulator display string to a display server; and
displaying the data elements indicative of the OOBC demodulator operational status.

5. The method of claim 1, wherein the plurality of SPUs are set top boxes (STBs) and wherein the STBs are addressable via an out-of-band channel (OOBC), wherein the upstream network component comprises an OOBC modulator and wherein determining the operational status of a network component upstream from the common node based on the node operational status of all nodes serviced by the upstream network component comprises:
determining the node operational status of nodes associated with the OOBC modulator;
when the node operational status of at least one node associated with the OOBC modulator is responsive, then setting a modulator operational status of the OOBC modulator to responsive;
when the node operational status of the nodes associated with the OOBC modulator is non-responsive, then setting the OOBC modulator operational status of the OOBC modulator to non-responsive; and
taking remedial action to repair the OOBC modulator.

6. The method of claim 5 further comprising:
creating an OOBC modulator display string comprising data elements indicative of the OOBC modulator operational status;
sending the OOBC modulator display string to a display server; and
displaying the data elements indicative of the OOBC modulator operational status.

7. The method of claim 1, wherein the plurality of SPUs are cable modems (CMs) and wherein the CMs are addressable via a high speed data channel (HSDC), wherein the upstream network component comprises an HSDC modulator and wherein determining the operational status of a network component upstream from the common node based on the node operational status of all nodes serviced by the upstream network component comprises:
determining the node operational status of nodes associated with the HSDC modulator;
when the node operational status of at least one node associated with the HSDC modulator is responsive, then setting a modulator operational status of the HSDC modulator to responsive;
when the node operational status of the nodes associated with the HSDC modulator is non-responsive, then setting the HSDC modulator operational status of the HSDC modulator to non-responsive; and
taking remedial action to repair the HSDC modulator.

8. The method of claim 7 further comprising:
creating an HSDC modulator display string comprising data elements indicative of the HSDC modulator operational status;
sending the HSDC modulator display string to a display server; and
displaying the data elements indicative of the HSDC modulator operational status.

9. A system for determining an operational status of a segment of a distribution network comprising:
a ping list generator, configured for:
accessing a ping datastore to acquire ping data associated with a plurality of subscriber premises units (SPUs) connected to the distribution network through a common node, wherein the ping data comprise for each SPU of the plurality of SPUs a ratio of a number of ping responses to a number of ping queries;
selecting a primary SPU, wherein the primary SPU has the highest ratio of ping responses to ping queries and wherein the primary SPU is associated with a primary SPU IP address;
selecting a secondary SPU, wherein the secondary SPU has the second highest ratio of ping responses to ping queries and wherein the secondary SPU is associated with a secondary SPU IP address; and an SPU pinger, wherein the SPU pinger is configured for:
pinging the primary IP address of the primary SPU;
setting an SPU operational status of the primary SPU as responsive and setting a node operational status of the common node to responsive when a response from the ping is received;
pinging the secondary SPU when a response from the ping is not received from the primary SPU;
setting an SPU operational status of the secondary SPU as responsive and setting the node operational status of the common node to responsive when the response from the ping of the secondary SPU is received; and a results processor, wherein the results processor is configured for determining an operational status of a network component upstream from the common node based on the node operational status of all nodes serviced by the upstream network component.

10. The system of claim 9 further comprising a display server and wherein the results processor is further configured for:
creating a node display string comprising data elements indicative of the common node operational status; and
sending the node display string to a display server; and
wherein the display server is configured for displaying the data elements indicative of the common node operational status.

11. The system of claim 9, wherein the plurality of SPUs are set top boxes (STBs) and wherein the STBs are addressable via an out-of-band channel (OOBC), wherein the upstream network component comprises an OOBC demodulator and wherein the results processor is further configured for:
determining the node operational status of nodes associated with the OOBC demodulator;
setting the OOBC demodulator operational status of the demodulator to responsive when the node operational status of at least one node associated with the OOBC demodulator is responsive; and
setting the OOBC demodulator operational status of the demodulator to non-responsive when the node operational status of the nodes associated with the OOBC demodulator is non-responsive.

12. The system of claim 11 further comprising a display server and wherein the results processor is further configured for:
creating an OOBC demodulator display string comprising data elements indicative of the OOBC demodulator operational status; and
sending the OOBC demodulator display string to a display server; and
wherein the display server comprises instruction for displaying the data elements indicative of the OOBC demodulator operational status.

13. The system of claim 9, wherein the plurality of SPUs are set top boxes (STBs) and wherein the STBs are addressable via an out-of-band channel (OOBC), wherein the upstream network component comprises an OOBC modulator and wherein the results processor is further configured for:
determining the node operational status of nodes associated with the OOBC modulator;
setting the OOBC modulator operational status of the OOBC modulator to responsive when the node operational status of at least one node associated with the OOBC modulator is responsive; and
setting the OOBC modulator operational status of the OOBC modulator to non-responsive when the node operational status of the nodes associated with the OOBC modulator is non-responsive.

14. The system of claim 13 further comprising a display server and wherein the results processor is further configured for:
creating a modulator display string comprising data elements indicative of the OOBC modulator operational status; and
sending the OOBC modulator display string to a display server; and
wherein the display server is configured for displaying the data elements indicative of the OOBC modulator operational status.

15. The system of claim 9, wherein the plurality of SPUs are cable modems (CMs) and wherein the CMs are addressable via an out-of-band channel (HSDC), wherein the upstream network component comprises an HSDC modulator and wherein the results processor is further configured for:
determining the node operational status of nodes associated with the HSDC modulator;
setting the HSDC modulator operational status of the HSDC modulator to responsive when the node operational status of at least one node associated with the HSDC modulator is responsive; and
setting the HSDC modulator operational status of the HSDC modulator to non-responsive when the node operational status of the nodes associated with the HSDC modulator is non-responsive.

16. The system of claim 15 further comprising a display server and wherein the results processor is further configured for:
creating a modulator display string comprising data elements indicative of the HSDC modulator operational status; and
sending the HSDC modulator display string to a display server; and
wherein the display server is configured for displaying the data elements indicative of the HSDC modulator operational status.

* * * * *